US006094910A

United States Patent [19]

Vatne

[11] Patent Number: 6,094,910

[45] Date of Patent: Aug. 1, 2000

[54] APPARATUS AND METHOD FOR RAISING AND LOWERING A PISTON IN A PISTON CYLINDER ARRANGEMENT IN A DERRICK

[75] Inventor: Per Vatne, Kristiansand, Norway

[73] Assignee: Maritime Hydraulics AS, Kristiansand, Norway

[21] Appl. No.: 09/091,569

[22] PCT Filed: Dec. 18, 1996

[86] PCT No.: PCT/NO96/00294

§ 371 Date: Jun. 22, 1998

§ 102(e) Date: Jun. 22, 1998

[87] PCT Pub. No.: WO97/23706

PCT Pub. Date: Jul. 3, 1997

[30] Foreign Application Priority Data

Dec. 22, 1995 [NO] Norway .................................... 955251

[51] Int. Cl.[7] ..................................................... F16D 31/02

[52] U.S. Cl. ................................ 60/416; 60/477; 91/421; 91/436; 91/458; 91/519

[58] Field of Search ............................ 60/413, 416, 477; 91/421, 435, 436, 458, 519

[56] References Cited

U.S. PATENT DOCUMENTS

| | | | |
|---|---|---|---|
| 4,216,702 | 8/1980 | Brundidge et al. | 91/516 |
| 4,397,221 | 8/1983 | Friesen et al. | 91/436 X |
| 4,635,532 | 1/1987 | Tanino et al. | 91/436 |
| 4,723,476 | 2/1988 | Stucky | 91/436 |
| 5,014,734 | 5/1991 | Smith | 91/436 X |
| 5,034,892 | 7/1991 | Saotome | 60/413 X |

FOREIGN PATENT DOCUMENTS 2 106 955 4/1983 United Kingdom .

*Primary Examiner*—Hoang Nguyen
*Attorney, Agent, or Firm*—Pillsbury Madison & Sutro LLP

[57] ABSTRACT

Disclosed is an apparatus for a derrick, including hydraulic piston/cylinder arrangements for raising and lowering a yoke travelling on guide rails attached to the derrick. A hydraulic system having different modes of operation is provided for the operation of the piston/cylinder arrangements. The hydraulic system can operate in a normal mode for raising or lowering the yoke and in other modes by interconnecting upper and lower chambers of the piston/cylinder arrangements and utilizing a differential surface area of the piston exposed to the two chambers for rapidly raising or lowering the yoke.

16 Claims, 12 Drawing Sheets

APPARATUS AND METHOD FOR RAISING AND LOWERING A PISTON IN A PISTON CYLINDER ARRANGEMENT IN A DERRICK

This application is the national phase of international application PCT/NO96/00294 filed Dec. 18, 1996.

BACKGROUND OF THE INVENTION

The present invention relates to an apparatus for a derrick, comprising two or more hydraulic piston/cylinder arrangements for raising and lowering a yoke which travels on guide rails in the derrick itself, where two or more wire lines are strung over sheaves rotatably attached to the yoke, said wire lines being at one end attached to the top drive and at the other end to an attachment point adjacent to a drill floor, said two or more wire lines being run in two sets of lines, the attachment points of which are spaced apart.

DESCRIPTION OF THE RELATED ART

A derrick structure, developed by the present inventor in 1987, that has shown great promise is the RamRig™ concept. Two or more hydraulic piston/cylinder arrangements are used in the derrick for raising and lowering the drill string. The cylinders operate between the drill floor and a yoke which travels on guide rails in the derrick itself. The advantages of this concept are numerous, some of the most important being that it is possible to place the drill floor at a higher level than the platform floor, that a derrick having significantly lower air resistance can be constructed, and that the most expensive components of the derrick attain higher safety and a longer lifetime.

Since it is possible to position the drill floor higher than the platform floor, pipe handling is significantly simplified. There is no longer any need to arrange the pipe handling equipment at a high level in the derrick. All pipe handling equipment can be placed on the platform floor and the drill floor.

SUMMARY OF THE INVENTION

The object of the present invention is to solve important. practical problems in the realization of the RamRig™ concept. The present invention is an apparatus for a derrick, including hydraulic piston/cylinder arrangements for raising and lowering a yoke travelling on guide rails attached to the derrick. A hydraulic system having different modes of operation is provided for the operation of the piston/cylinder arrangements. The hydraulic system can operate in a normal mode for raising or lowering the yoke and in other modes by interconnecting upper and lower chambers of the piston/cylinder arrangements and utilizing a differential surface area of the piston exposed to the two chambers for rapidly raising or lowering the yoke. Accumulators can be used to provide additional pressure to the piston/cylinder arrangements.

BRIEF DESCRIPTION OF THE DRAWING

The invention will now be explained in greater detail with reference to the enclosed drawings, where.

DETAILED DESCRIPTION OF THE PREFERRED EMBODIMENTS

Figure 1:
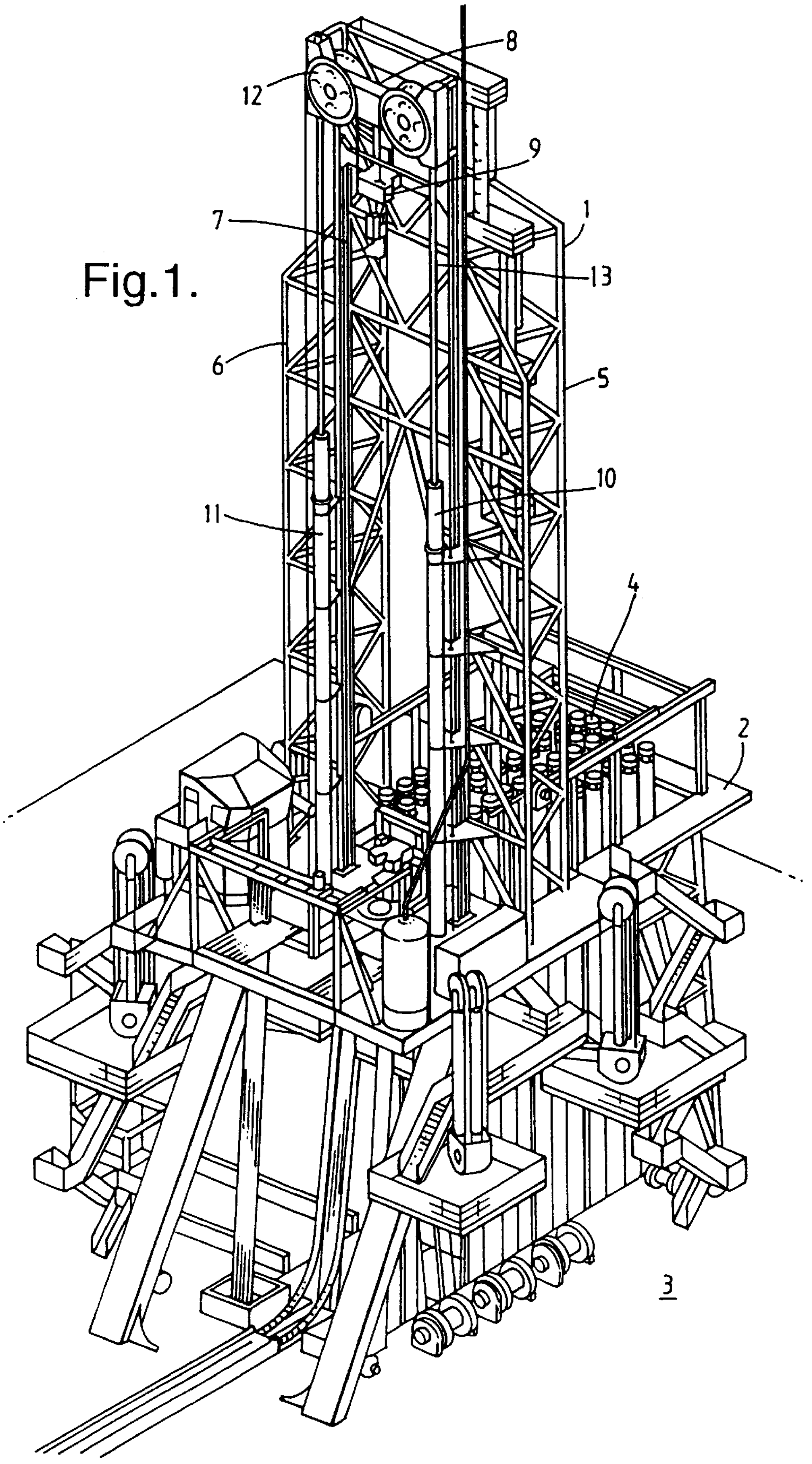
FIG. 1 shows a RamRig™ derrick in every essential detail.

FIG. 1 shows a derrick 1 positioned on a drill floor 2. The drill floor is positioned at a higher level than the platform floor 3, so that the pipe handling equipment 4 can be placed, in the main, between the platform floor 3 and the drill floor 2. The derrick 1 is substantially gantry-shaped, with gantry legs 5, 6. Guide rails 7 for a yoke 8 and a top-drive 9 run along each gantry leg 5, 6. Hydraulic piston/cylinder arrangements 10, 11 are positioned so that they extend along each gantry leg 5, 6 and operate between the drill floor 2 and the yoke 8, for moving the yoke 8 vertically along the guide rails 7.

The yoke 8 is provided with a plurality of sheaves 12, preferably four, for running wire lines 13. The wire lines 13 run from the drill floor 2 along each gantry leg 5, 6, over the sheaves 12 and down to the top drive 9. By retracting and extending the piston/cylinder arrangement 10, 11, it is thus possible to raise and lower the top drive 9.

Figure 2:
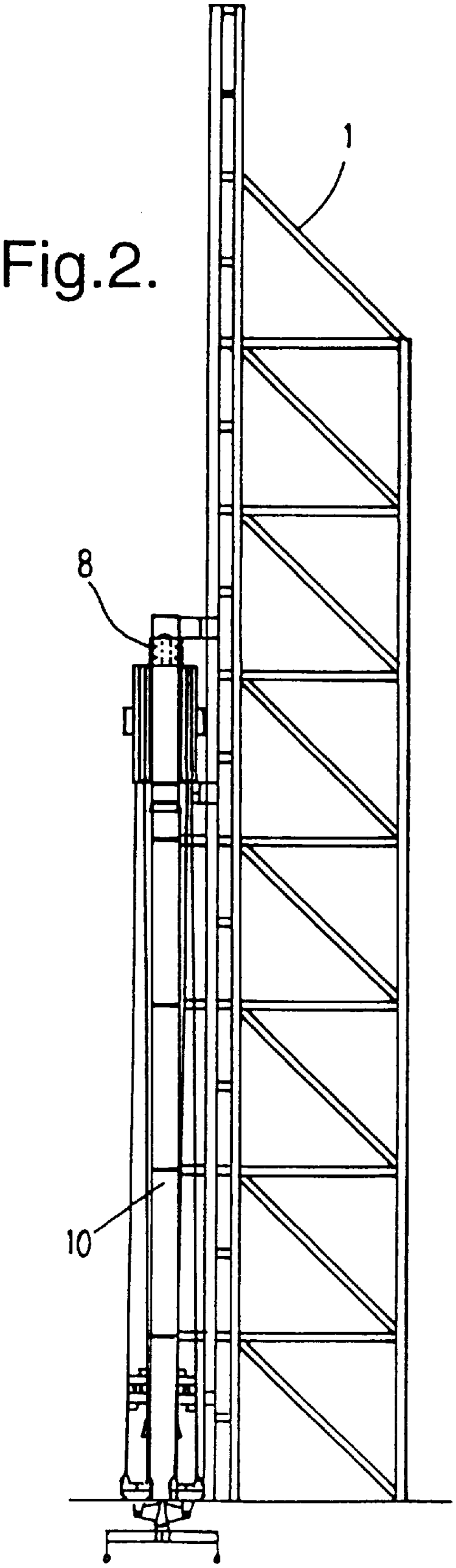
FIG. 2 shows the derrick schematically, viewed from the side.
Figure 3:
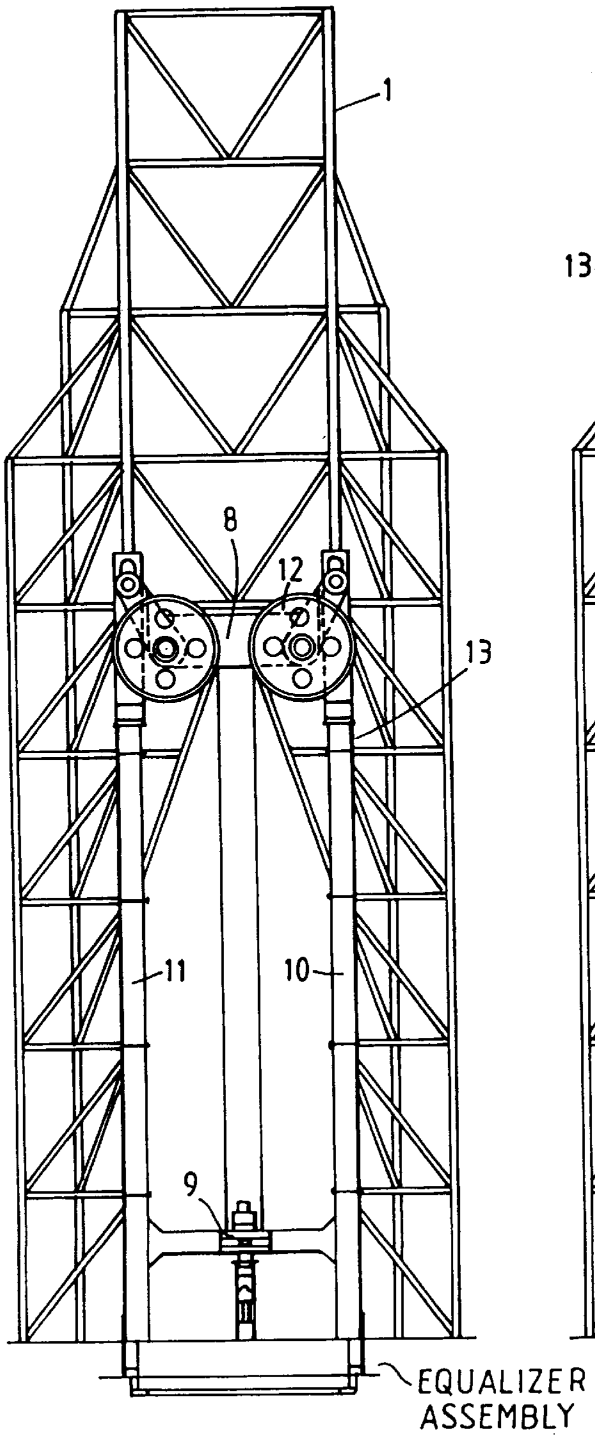
FIG. 3 shows the derrick schematically, viewed from the front, with the top drive in its lowest position.
Figure 4:
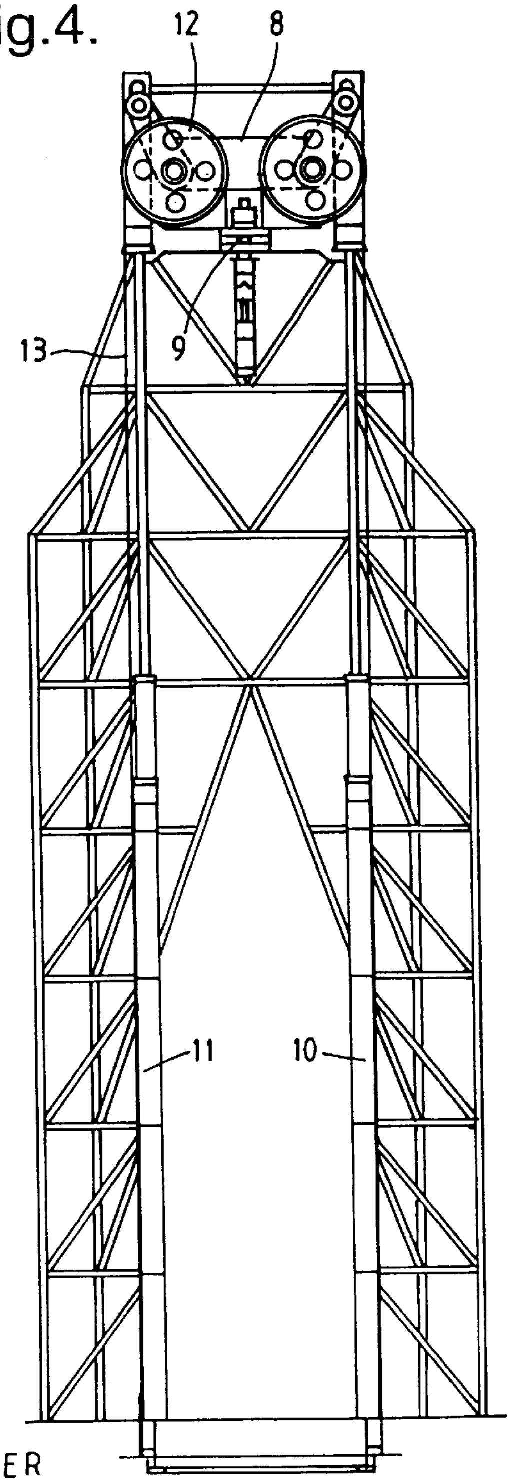
FIG. 4 shows the derrick schematically, viewed from the front, with the top drive in its highest position.

In FIGS. 2, 3 and 4, the function of the lift system is seen most clearly. In FIGS. 2 and 3, the piston/cylinder arrangement 10, 11 is shown in a completely retracted condition. The top drive 9 is then in its lowest position, quite close to the drill floor. The yoke 8 is at the upper end of the piston/cylinder arrangement.

When the pistons in the piston/cylinder arrangement are extended, the yoke 8 is lifted along the guide rails 7 up to the top of the derrick 1. The top drive is then lifted, as a result of the exchange created by the wire lines 13 being run over the sheaves 12, from its position adjacent to the drill floor 2 to a position directly below the yoke 8. The height to which the top drive 9 is lifted is thus the double of that to which the yoke 8 is lifted.

There may, for example, be as much as eight wire lines 13 arranged in the lift means described above, where two and two are strung in their own separate tracks over the same sheave 12. Four sheaves are arranged in pairs at each end of the yoke 8. The wire lines 13 are thus arranged in two sets 13*a* and 13*b*, extending from attachment points 14*a* and 14*b* at the drill floor 2, over the sheaves 12 and down to the top drive 9. The attachment points 14*a* and 14*b* are horizontally spaced apart by a distance approximately like the length of the yoke 8.

Figure 5:
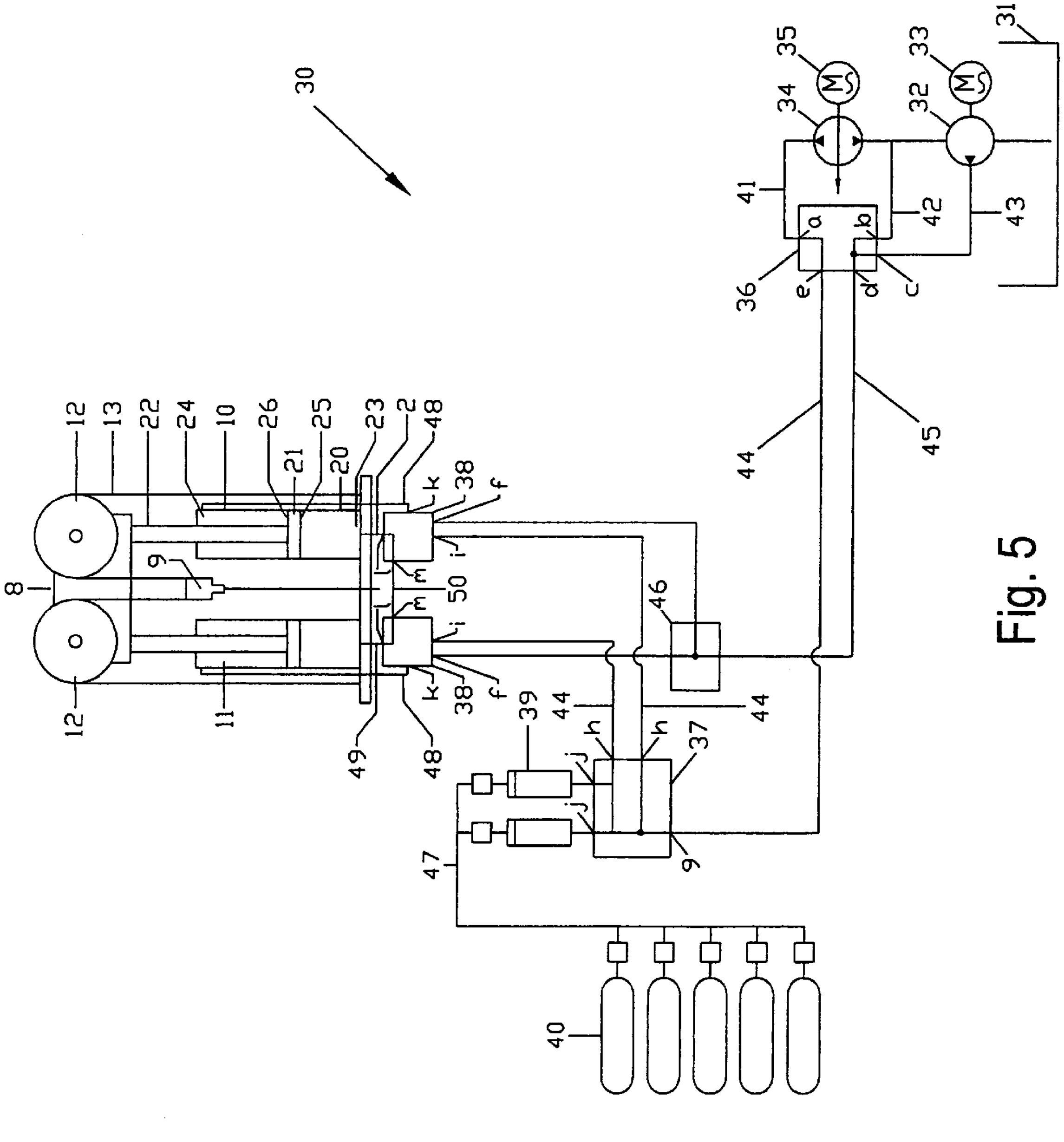
FIGS. 5–13 show the drive means of the piston/cylinder arrangements in various modes of operation.

In FIG. 5 the piston/cylinder arrangements 10, 11 are schematically illustrated. Here the yoke 8 is also shown, together with the sheaves 12 and the top drive 9. The drill floor 2 is also indicated. From the drill floor 2 each of the wire lines 13 runs over its own sheave 12 and down to the top drive 9. Each piston/cylinder arrangement 10, 11 consists of a cylinder and a piston 21 having a piston rod 22. The cylinder 20 is at one end attached to the drill floor 2, whereas the piston rod 22 is attached to the yoke 8. The piston 21 divides the cylinder into two chambers, a lower chamber 23 and an upper chamber 24. The lower chamber 23 is circular/cylindrical and only delimited by the walls of the cylinder 20 and the lower end surface 25 of the piston 21. The upper chamber 24 is also delimited by the walls of the cylinder 20, but is in addition delimited by the piston rod 22 and the upper annular surface 26 of the piston 21. It will thus be seen that hydraulic fluid in the lower chamber 23 has a larger operating surface with respect to the piston 21 than hydraulic fluid in the upper chamber 24, since the lower end surface 25 of the piston is larger than its upper annular surface 26.

The drive system which is here generally designated by reference numeral 30, consists of a reservoir 31, a feed pump 32 driven by a motor 33, one or more main pumps 34 driven by one or more motors 35, a control valve 36, an accumulator/valve plate 37, a cylinder valve 38 for each cylinder 20, one or more accumulators 39 and one or more pressure tanks 40.

From each side of the main pumps 34 lines 41, respectively 42, lead to a separate port a, b for each, in the control valve 36. A line 43 leads from the reservoir 31, via the feed pump 38 to a third port c in the control valve 36. From a fifth port e in the control valve 36 a line 44 leads to the accumulator/valve plate 37. From a fourth port d in the control valve 36 a line 45 leads via a ramification 46, where the line 45 branches so as to create one line for each cylinder 20 leading into a port f in each cylinder valve 38. The line 44 which leads into a port g in the accumulator/valve plate 37, splits here into branches which lead from a number of ports h to the control valve 38 of each cylinder 20 into a port i for each control valve 38. The accumulators 39 are connected to the accumulator valve plate 37 via ports j. It must be understood that both ports h and ports j respectively may represent a plurality of ports or optionally one port branching outside the accumulator/valve plate 37. The accumulators 39 are connected to the pressure tanks 40 via a line 47.

A line 48, connected with the upper chamber 24 of the cylinder 20, extends from a port k in each cylinder valve 38. From a port l in each cylinder valve a line 49 leads to the chamber 23 of the cylinder 20. A line 50 connects ports m in each cylinder valve 38.

Now, since the construction of the drive means 30 of the piston/cylinder arrangements 10, 11 has been explained, the mode of operation of this drive means 30 shall be explained by means of FIGS. 5–13, as follows.

In FIG. 5, the piston/cylinder arrangements 10, 11 are in a locked position. The main pump 34 is set for zero displacement volume, and the connection between the ports k and the ports f and i is closed. Thus, there is no flow of hydraulic fluid in the system.

Figure 6:
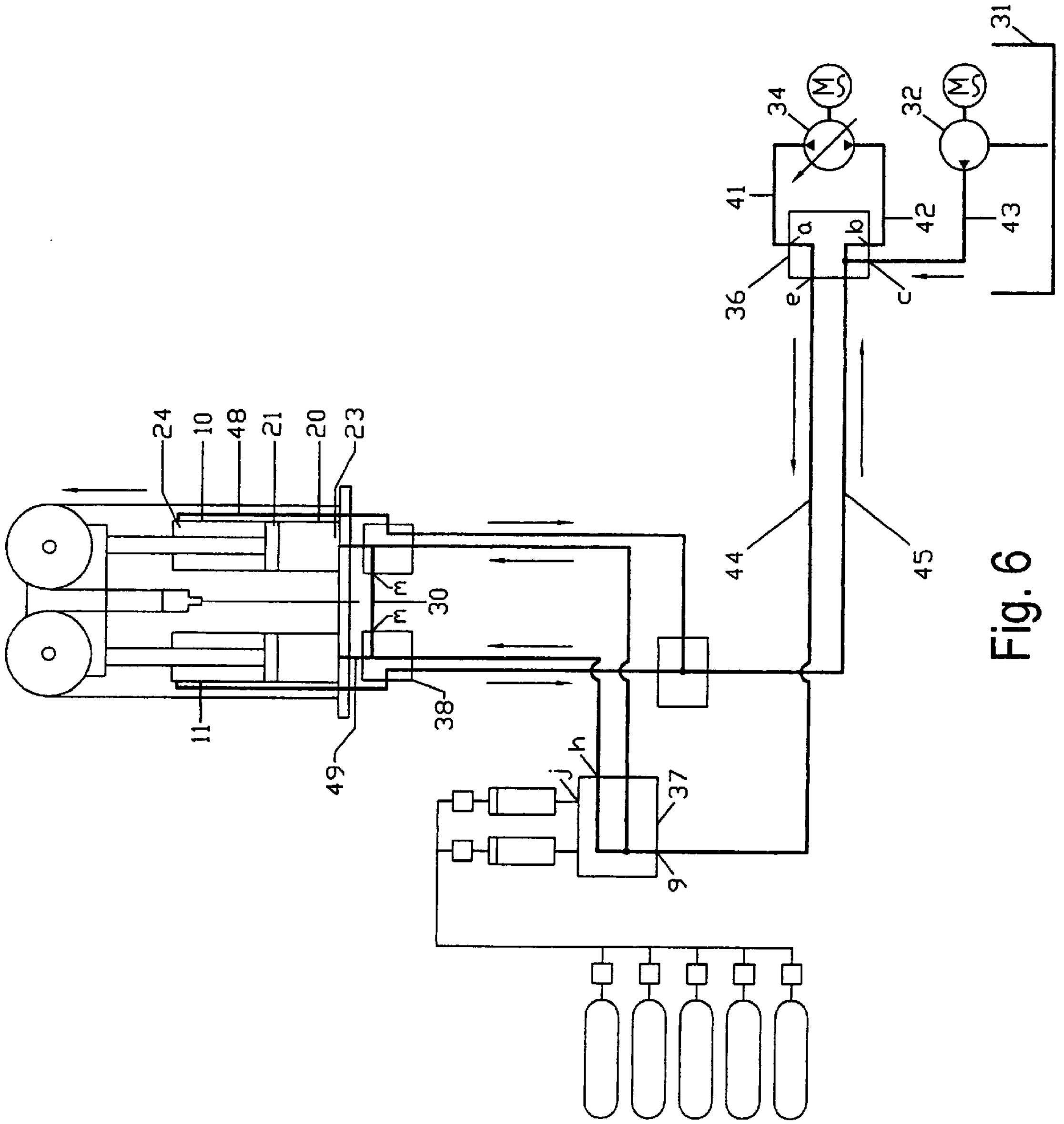

In FIG. 6 the piston/cylinder arrangements are extended for maximum thrust power, but at low velocity. Now the displacement volume of the main pump 34 is adjusted so that hydraulic fluid flows from the reservoir 31, via the feed pump 32 and the line 43, in through the port c in the control valve 36, out through the port b, through the line 42 via the main pump 34 and the line 41 to port a of the control valve 36, out through the port e, via the line 44 to port g of the accumulator valve plate and from this via the ports h to the ports i in the cylinder valves 38 and further out through the ports l and the lines 49 to the chamber 23 of the cylinder 20. Hydraulic fluid, displaced from the chamber 24 of the cylinder 20, flows via the lines 48, via the cylinder valves 38 and the line 45 back to the control valve 36 and main pump 34. The ports j in the accumulator valve plate 37 are closed. The connection 50 between the ports m of the cylinder valves 38 is open, however, in order to ensure that there is equal pressure on the underside 25 of the pistons 21. In this mode the piston/cylinder arrangements 10, 11 would be extended at a comparatively low velocity, but with a relatively high thrust power.

Figure 7:
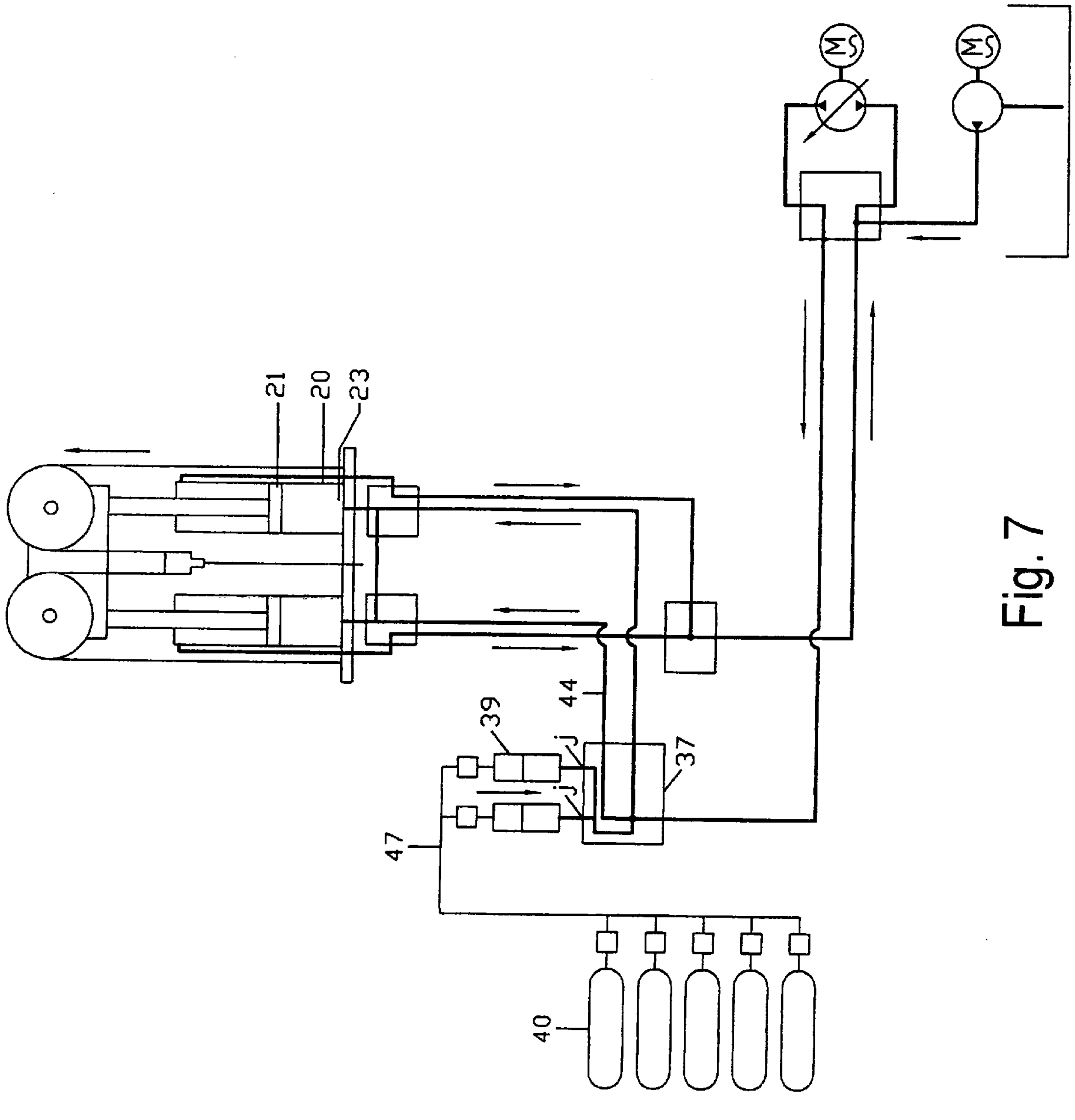

In FIG. 7 another mode is shown which, with respect to hydraulic fluid circulation, is quite in accordance with the mode shown in FIG. 6. However, here the ports j in the accumulator valve plate 37 have been opened up so that the accumulators 39, which are influenced by pressure from pressure tanks 4 via the line 47, increase the pressure in the hydraulic fluid which flows through the line 44 to the lower chamber 23 of the cylinders 20. The velocity of the pistons 21 is then somewhat increased at the same time as the thrust power is maintained at a high level.

Figure 8:
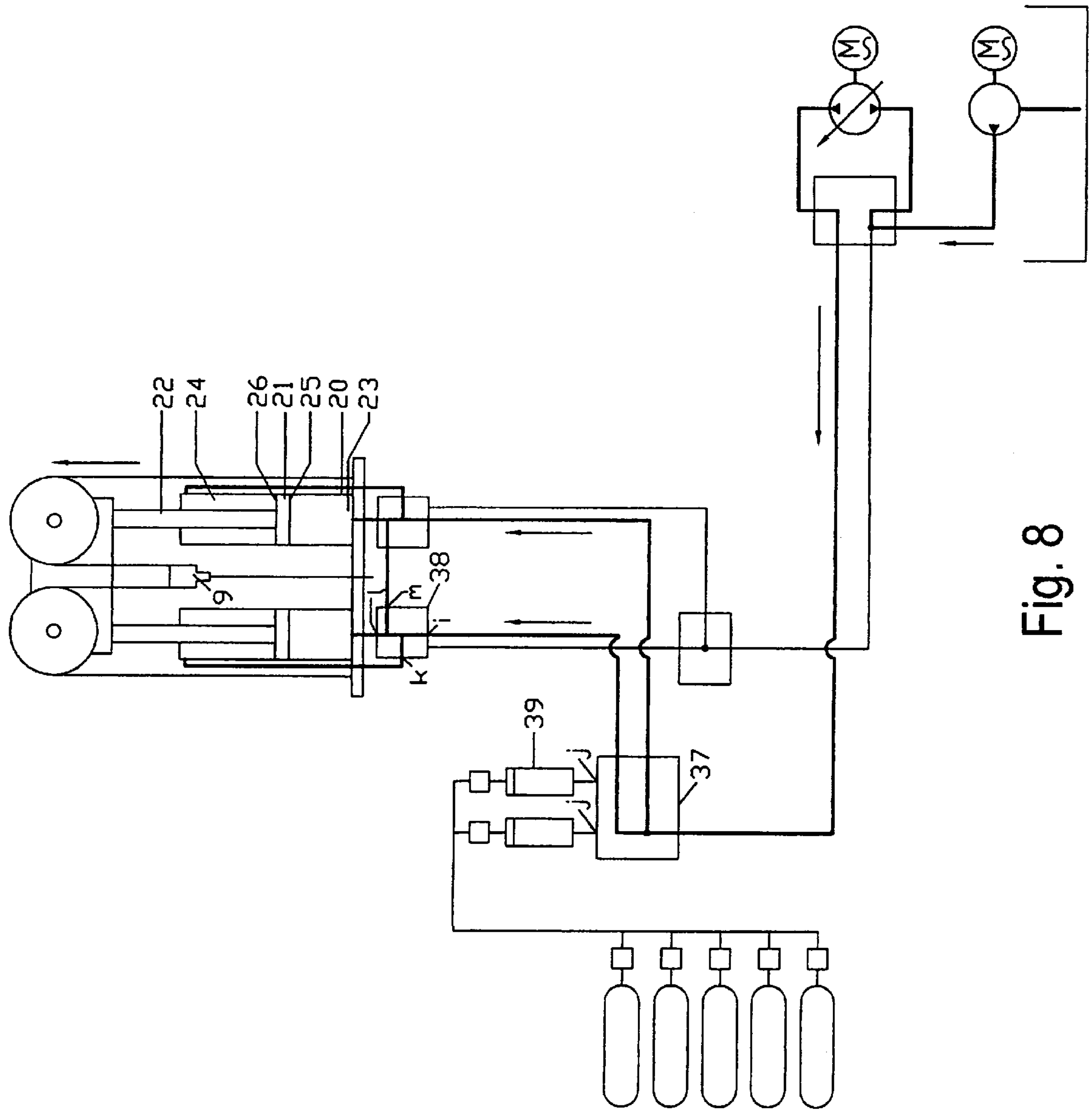

In FIG. 8 a mode is shown where the travelling speed of the pistons 21 has been further increased. At the same time the thrust force is reduced. This mode is thus well suited for raising the unloaded top drive 9. In this mode the connection is opened between the ports i, k, l and m in the control valves 38, so that the lower chamber 23 and the upper chamber 24 of the cylinders 20 are short circuited. Hence, the hydraulic pressure acts on a differential area which is equal to the difference between the area of the underside 25 of the piston 21 and the top side 26 of the piston 21, i.e., the cross-sectional area of the piston rod 22. Thus the piston 21 obtains a greater travelling speed at the same hydraulic pressure. In this mode the ports j in the accumulator valve plate 37 are closed so that the accumulators 39 do not function.

Figure 9:
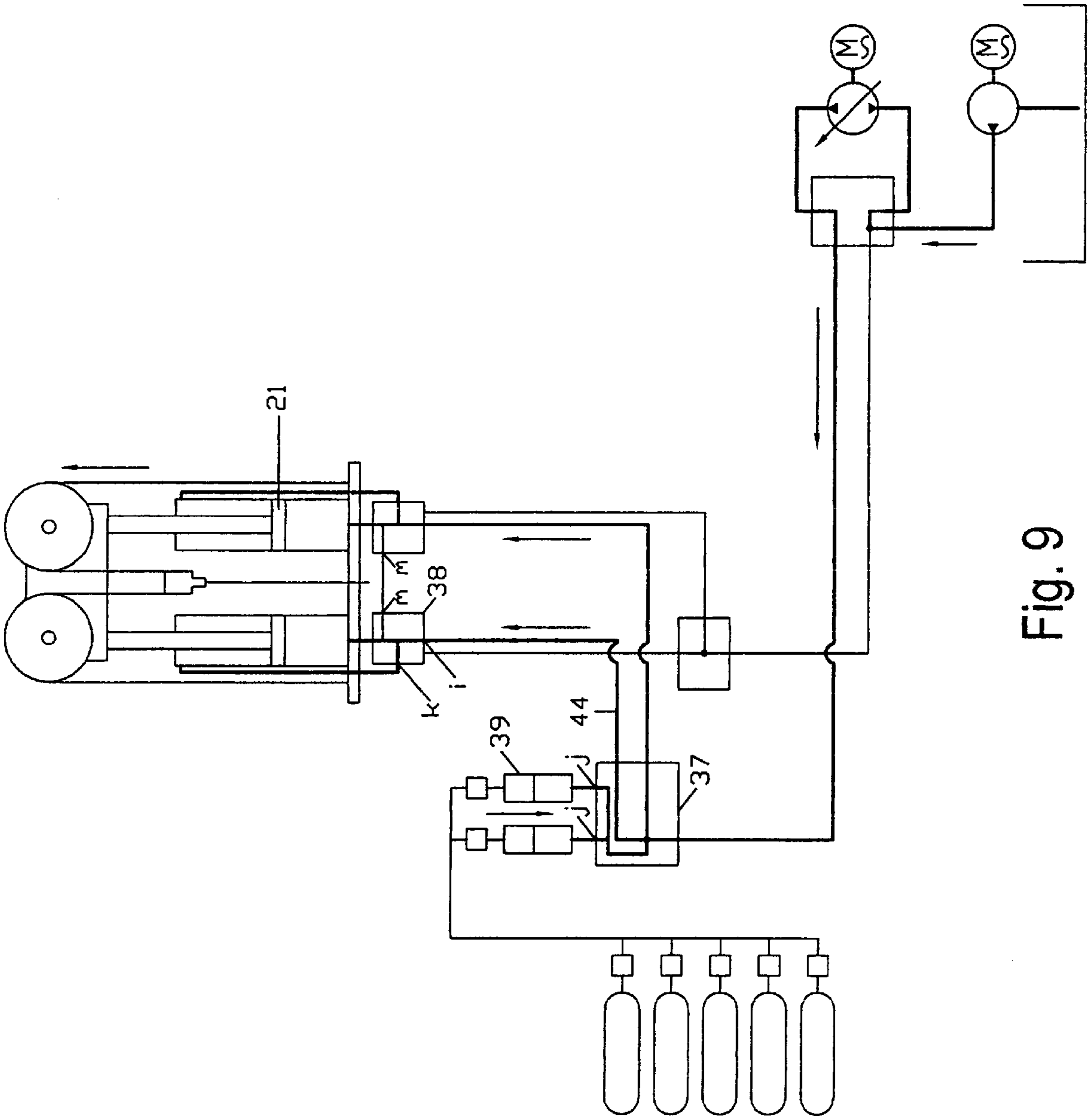

In FIG. 9 a further mode is shown, where the ports j of the accumulator valve plate 37 are opened so that the accumulators 39 supply an additional pressure into the line 44. As in FIG. 8, the connection between ports i, k and l in the cylinder valves 38 is open. The ports m may also be open in this mode, although this is not shown here. In this mode, the travelling speed of the piston 21 will be further increased because of the increased pressure in the line 44. The thrust force will still be comparatively low, however.

Figure 10:
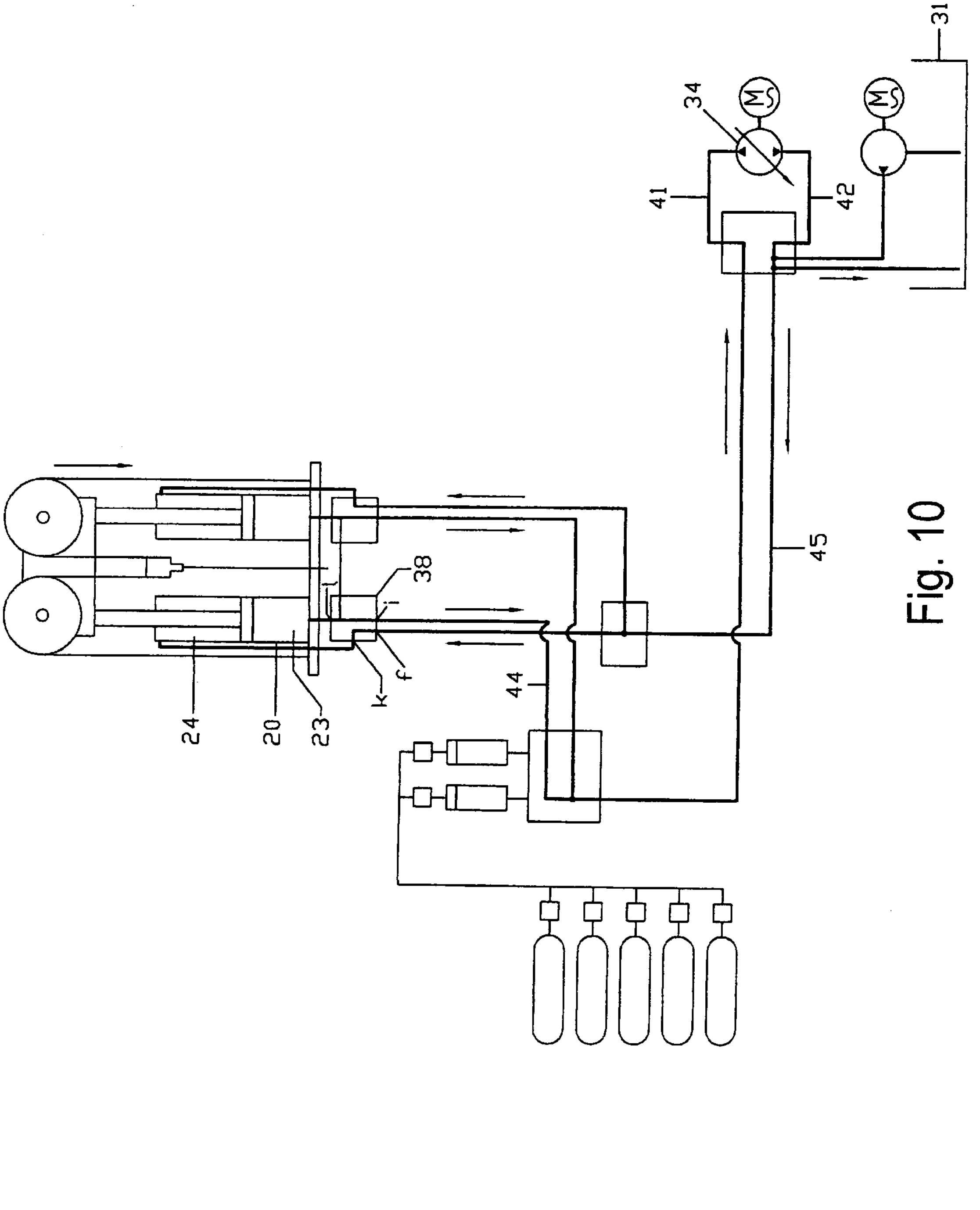

In FIG. 10 there is shown a lowering mode at maximum load and controlled speed. The main pump 34 is now readjusted so that the hydraulic fluid flows into the pump through the line 41 and out of the pump through the line 42. In this case the connection between the ports k of the lines 48 in the cylinder valves 38 and the port f of the line 45 in the cylinder valves 38 is open so that the hydraulic fluid flows into the upper chamber 24 of the cylinder. At the same time the connection between the port l and the port i in the cylinder valves 38 is open so that the hydraulic fluid in chamber 23 of the cylinder 20 flows out in the line 44. A part of the hydraulic fluid will flow back to the reservoir 31 for the very reason that the chamber 24 of the cylinder 20 has a smaller cross sectional area than the chamber 23.

Figure 11:
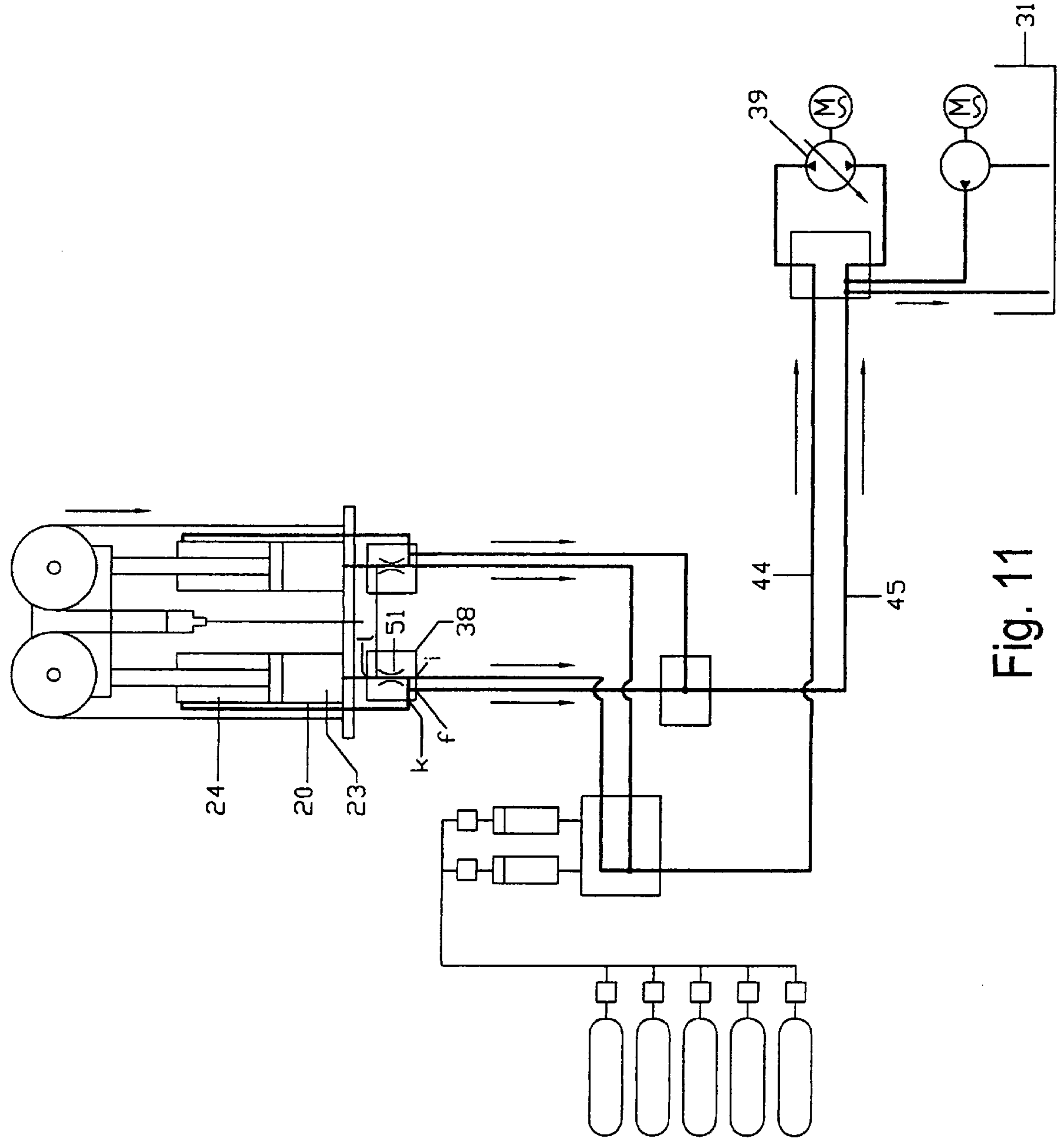

In FIG. 11 a lowering mode is shown where the lowering is carried out at up to maximum load and up to maximum velocity. Here the ports f, i, k and l in the cylinder valves 38 are connected with each other. Thus hydraulic fluid can freely flow out of the chamber 23 of the cylinder 20. Some of this fluid will flow back to the cylinder and into the chamber 24, whereas the remainder will flow through the lines 44 and 45 and further, to the reservoir 31. The lowering speed can be controlled to a certain degree by means of the main pump 34, but because of the fact that the connection between the cylinder valves 38 and the reservoir 31 via the line 45 is completely open, it will be expedient to control the lowering speed by means of a throttling 51, which, as shown here, may lie in the connection between the port l and the ports f, i and k in the cylinder valves 38. This mode will be well suited for carrying out hard thrusts with the drill string, if the need should arise.

Figure 12:
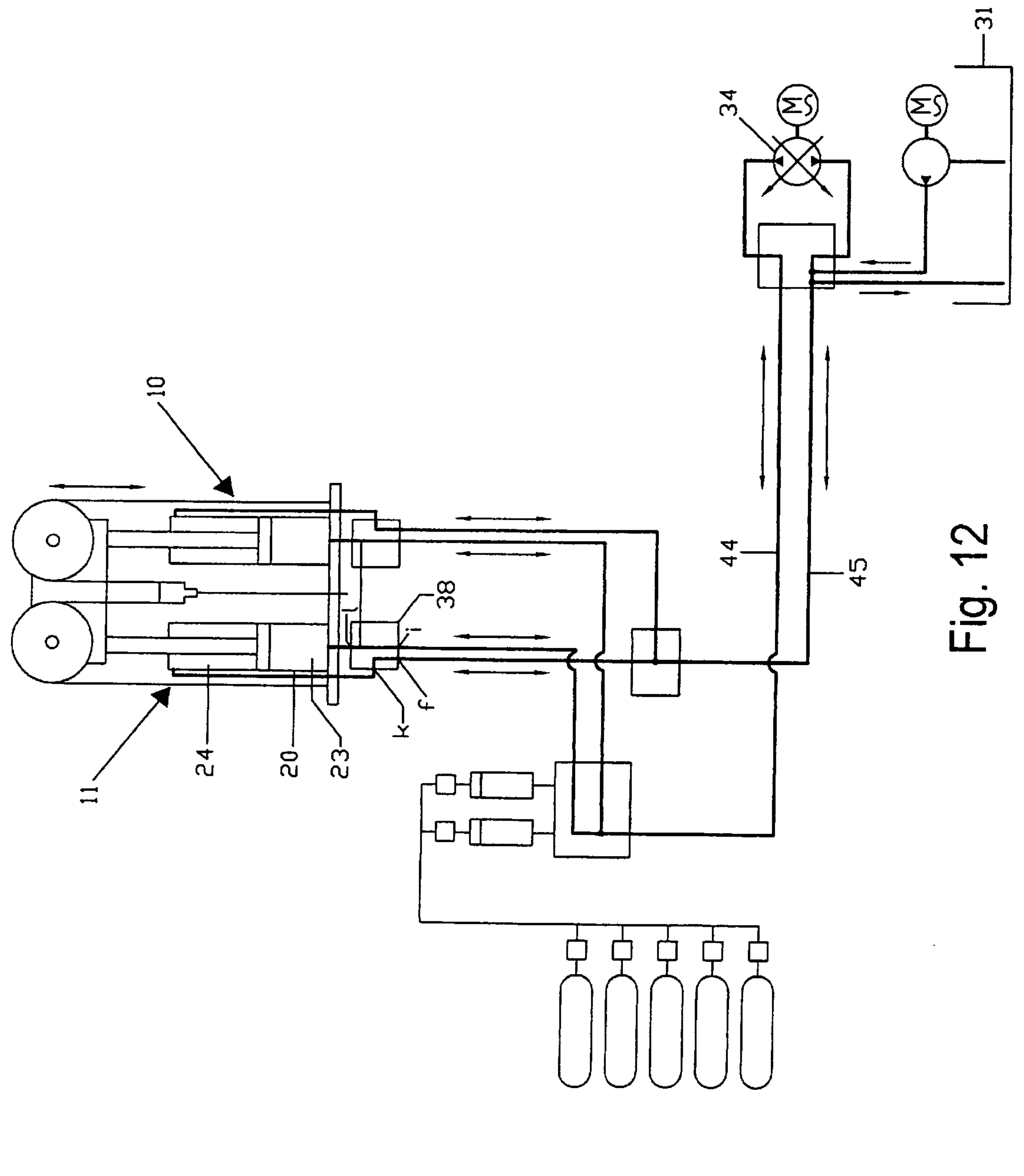

FIG. 12 shows a mode of operation where constant load is maintained during the movement of the piston/cylinder arrangements 10, 11. This mode is used, for example, for the drilling itself. In this mode the fluid flow goes back and forth in the system, and the displacement volume of the main pump 34 is adjusted in both directions in accordance with signals given from a load distributor (not shown). The connection between the ports f and k in the cylinder valve 38 is open, as is the connection between the ports i and l. The hydraulic fluid thus flows between the main pump 34 and the cylinder valve 38 via the line 44 and the line 45, respectively. The directions of the flow of fluid in these two lines will at all times be opposite to each other. A certain exchange of hydraulic fluid with the reservoir 31 will also occur, since the cross-sectional areas of the lower chamber 23 of the cylinder 20 and of the upper chamber 24 are different.

Figure 13:
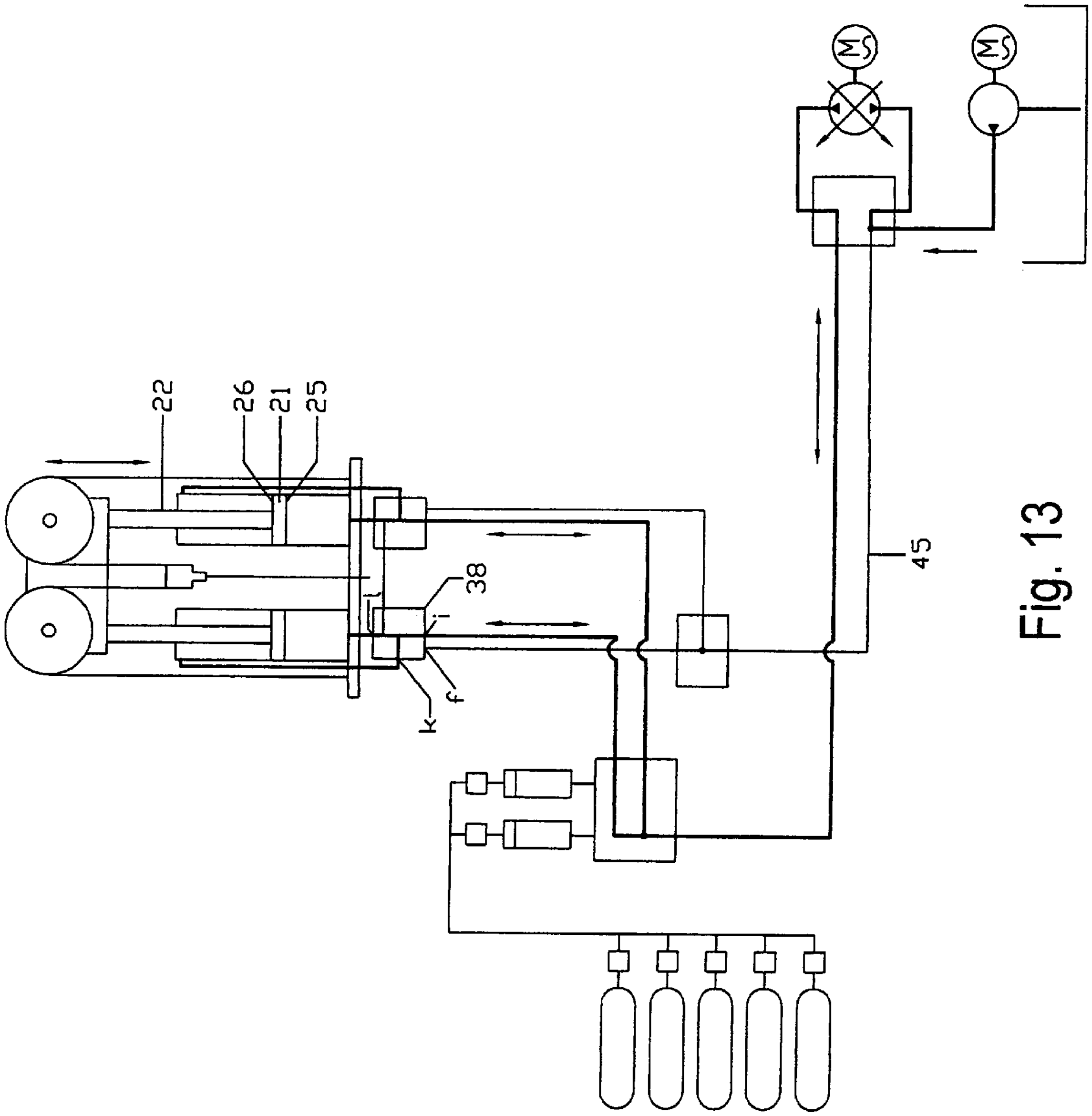

FIG. 13 shows a similar mode of operation, where the purpose is to maintain a constant load while the pistons 21 are moved. In this mode, however, a greater velocity is achieved with respect to the travel of the piston. The port f in the valve 38 is now closed, so that there no longer will be any fluid flow in the line 45. The ports i, k and l in the cylinder valve 38 are connected with each other, however. Thus, in the same manner as in the mode according to FIG. 9, the area of piston 21 activity will be the differential area between the area of the lower surface 25 of the piston and the area of the upper annular surface 26 of the piston. This corresponds to the cross-sectional area of the piston rod 22. A faster move of the piston 21 will then be obtained even if the pressure in the system is unchanged.

Even though the use of the accumulators 39 to provide increased pressure in the system has been shown in only a few of the modes shown in FIGS. 5–9, it must nevertheless be understood that the accumulators may be used in any one of the modes shown, for increasing the pressure in the system and thus increase either the velocity of the piston movement, the force by which the piston 21 is moved or both. In the lowering of the pistons 21. It will be expedient to open the ports j in the accumulator valve plate 37 in order to transfer some of the pressure created hereby into the accumulators 39, which thereby charge the pressure tanks 40 via the line 47. Hence, it will be ensured that there is extra power available from the accumulators 39 when this is needed. Even in the modes for constant loads it may be expedient to use the accumulators 39.

What is claimed is:

1. An apparatus for a derrick, comprising:

at least one hydraulic piston/cylinder arrangement, the hydraulic piston/cylinder arrangement including a cylinder and a piston, said cylinder including a lower cylinder chamber and an upper cylinder chamber, said lower and upper chambers being separated by said piston, said piston including a piston rod, said piston including a lower surface facing said lower chamber and an upper surface facing said upper chamber, said lower surface including an area being different from an area of said upper surface, a yoke coupled to said piston rod of the hydraulic piston/cylinder arrangement adapted for being raised and lowered upon actuation of the hydraulic piston/cylinder arrangements, guide rails connected to the derrick, said yoke being adapted to travel on said guide rails, a hydraulic system for operating said piston/cylinder arrangement, said hydraulic system including:

a reservoir, at least one main pump, said pump including inlet and outlet ports for supplying a hydraulic fluid pressure to said piston/cylinder arrangement, a valve system for control of said hydraulic pressure to said lower cylinder chamber and said upper cylinder chamber, respectively, including at least one cylinder control valve having a plurality of ports, said cylinder control valve having various modes of operation, said cylinder control valve opening and closing communication between said ports in said various modes of operation to selectively establish connection between:

(1) said lower chamber of said cylinder and said outlet port of said main pump and between said upper chamber of said cylinder and said inlet port of said main pump for normal raising of said yoke; and between said lower chamber of said cylinder and said inlet port of said main pump and between said upper chamber of said cylinder and said outlet port of said main pump for normal lowering of said yoke;

(2) said lower and upper chambers of said cylinder, and between said chambers and said inlet port of said main pump, for rapid lowering of the yoke; and (3) said lower and upper chambers of said cylinder, and between said chambers and said outlet port of said main pump for rapid raising of the yoke;

said cylinder control valve including a first port, said hydraulic system including a first line for connecting said first port with one of said inlet port and said outlet port of said pump;

said cylinder control valve including a second port, said hydraulic system including a second line for connecting said second port with one of said inlet port and said outlet port of said pump;

said cylinder control valve including a third port, said hydraulic system including a third line for connecting said third port with said upper chamber;

said cylinder control valve including a fourth port, said hydraulic system including a fourth line for connecting said fourth port with said lower chamber;

said cylinder control valve adapted for selectively connecting said first port with said third port and said second port with said fourth port for the normal raising and lowering of said yoke;

said cylinder control valve adapted for selectively connecting said second port, said third port and said fourth port with each other for the rapid raising of said yoke; and said cylinder control valve adapted for selectively connecting said first port, said third port and said fourth port with each other for the rapid lowering of said yoke.

2. An apparatus according to claim 1, wherein said hydraulic system further comprises at least one accumulator, said accumulator connectable to said lower chamber during raising of said yoke, in order to provide extra pressure to said chamber so that said yoke moves faster.

3. An apparatus according to claim 2, wherein said accumulator is connectable to said lower chamber during lowering of said yoke, so that hydraulic pressure generated in said lower chamber will charge said accumulator.

4. An apparatus according to claim 3, comprising a plurality of hydraulic piston/cylinder arrangements and a plurality of cylinder control valves, at least two of said cylinder control valves including a fifth port, said fifth port of one of said cylinder control valves being selectively connectable with a the fifth port of the other of said cylinder control valves to equalize pressure differences between said lower chambers of the plurality of cylinders.

5. An apparatus according to claim 1, comprising a throttle between said lower chamber and said inlet port of said pump.

6. An apparatus according to claim 1, comprising a plurality of hydraulic piston/cylinder arrangements and a plurality of cylinder control valves.

7. An apparatus for a derrick, comprising:

at least one hydraulic piston/cylinder arrangement, the hydraulic piston/cylinder arrangement including a cylinder and a piston, said cylinder including a lower cylinder chamber and an upper cylinder chamber, said lower and upper chambers being separated by said piston, said piston including a piston rod, said piston including a lower surface facing said lower chamber and an upper surface facing said upper chamber, said lower surface including an area being different from an area of said upper surface, a yoke coupled to said piston rod of the hydraulic piston/cylinder arrangement adapted for being raised and lowered upon actuation of the hydraulic piston/cylinder arrangements, at least one guide rail connected to the derrick, said yoke being adapted to travel on said guide rail, a hydraulic system for operating said piston/cylinder arrangement, said hydraulic system including:

a reservoir, at least one main pump, said pump including inlet and outlet ports for supplying a hydraulic fluid pressure to said piston/cylinder arrangement, a valve system for control of said hydraulic pressure to said lower cylinder chamber and said upper cylinder chamber, respectively, including at least one cylinder control valve having a plurality of ports, said cylinder control valve having various modes of operation, said cylinder control valve opening and closing communication between said ports in said various modes of operation to selectively establish connection between:

(1) said lower chamber of said cylinder and said outlet port of said main pump and between said upper chamber of said cylinder and at least one of said inlet port of said main pump and said reservoir for normal raising of said yoke; and between said lower chamber of said cylinder and at least one of said inlet port of said main pump and said reservoir and between said upper chamber of said cylinder and said outlet port of said main pump for normal lowering of said yoke;

(2) said lower and upper chambers of said cylinder, and between said chambers and at least one of said inlet port of said main pump and said reservoir, for rapid lowering of the yoke; and (3) said lower and upper chambers of said cylinder, and between said chambers and said outlet port of said main pump for rapid raising of the yoke;

said cylinder control valve including a first port, said hydraulic system including a first line for connecting said first port with at least one of said inlet port of said pump, said reservoir and said outlet port of said pump;

said cylinder control valve including a second port, said hydraulic system including a second line for connecting said second port with at least one of said inlet port of said pump, said reservoir and said outlet port of said pump;

said cylinder control valve including a third port, said hydraulic system including a third line for connecting said third port with said upper chamber;

said cylinder control valve including a fourth port, said hydraulic system including a fourth line for connecting said fourth port with said lower chamber;

said cylinder control valve adapted for selectively connecting said first port with said third port and said second port with said fourth port for the normal raising and lowering of said yoke;

said cylinder control valve adapted for selectively connecting said second port, said third port and said fourth port with each other for the rapid raising of said yoke; and said cylinder control valve adapted for selectively connecting said first port, said third port and said fourth port with each other for the rapid lowering of said yoke.

8. An apparatus according to claim 7, wherein said hydraulic system further comprises at least one accumulator, said accumulator connectable to said lower chamber during raising of said yoke, in order to provide extra pressure to said chamber so that said yoke moves faster.

9. An apparatus according to claim 8, wherein said accumulator is connectable to said lower chamber during lowering of said yoke, so that hydraulic pressure generated in said lower chamber will charge said accumulator.

10. An apparatus according to claim 9, comprising a plurality of hydraulic piston/cylinder arrangements and a plurality of cylinder control valves, at least two of said cylinder control valves including a fifth port, said fifth port of one of said cylinder control valves being selectively connectable with a the fifth port of the other of said cylinder control valves to equalize pressure differences between said lower chambers of the plurality of cylinders.

11. An apparatus according to claim 7, comprising a throttle between said lower chamber and said inlet port of said pump.

12. An apparatus according to claim 7, comprising a plurality of hydraulic piston/cylinder arrangements and a plurality of cylinder control valves.

13. A method for raising and lowering a yoke of a derrick, the yoke connected to a piston of at least one hydraulic cylinder having an upper chamber and a lower chamber separated by the piston, comprising the steps of:

selectively establishing a hydraulic fluid connection between:

(1) the lower chamber and an outlet port of a pump and between the upper chamber and at least one of an inlet port of the pump and a hydraulic fluid reservoir connected between the cylinder and the pump for normal raising of the yoke; and between the lower chamber and at least one of the pump inlet port and the reservoir and between the upper chamber and the pump outlet port for normal lowering of the yoke;

(2) the lower and upper chambers, and between the chambers and at least one of the pump inlet port and the reservoir, for rapid lowering of the yoke; and (3) the lower and upper chambers, and between the chambers and the pump outlet port for rapid raising of the yoke;

wherein the step of establishing the hydraulic fluid connection is conducted by selectively operating a cylinder control valve to:

hydraulically connect a first port of the valve being in fluid communication with at least one of the pump inlet port, the reservoir and the pump outlet port to a third port of the valve being in fluid communication with the upper chamber and hydraulically connect a second port of the valve being in fluid communication with at least one of the pump inlet side port, the reservoir and the pump outlet port to a fourth port of the valve being in fluid communication with the lower chamber for the normal raising and lowering of said yoke;

hydraulically connect the second port, the third port and the fourth port of the valve to each other for the rapid raising of the yoke; and hydraulically connect the first port, the third port and the fourth port of the valve to each other for the rapid lowering of said yoke.

14. The method of claim 13 and further comprising the step of hydraulically connecting at least one hydraulic accumulator with the lower chamber for supplying extra hydraulic pressure to the lower chamber during the raising of the yoke.

15. The method of claim 14 and further comprising the step of hydraulically connecting the hydraulic accumulator with the lower chamber for being charged by the lower chamber during the lowering of the yoke.

16. The method of claim 13 and further comprising the step of throttling the connection between the lower chamber and the at least one of the pump inlet port and the reservoir to control a lowering speed of the yoke.

* * * * *